UNITED STATES PATENT OFFICE.

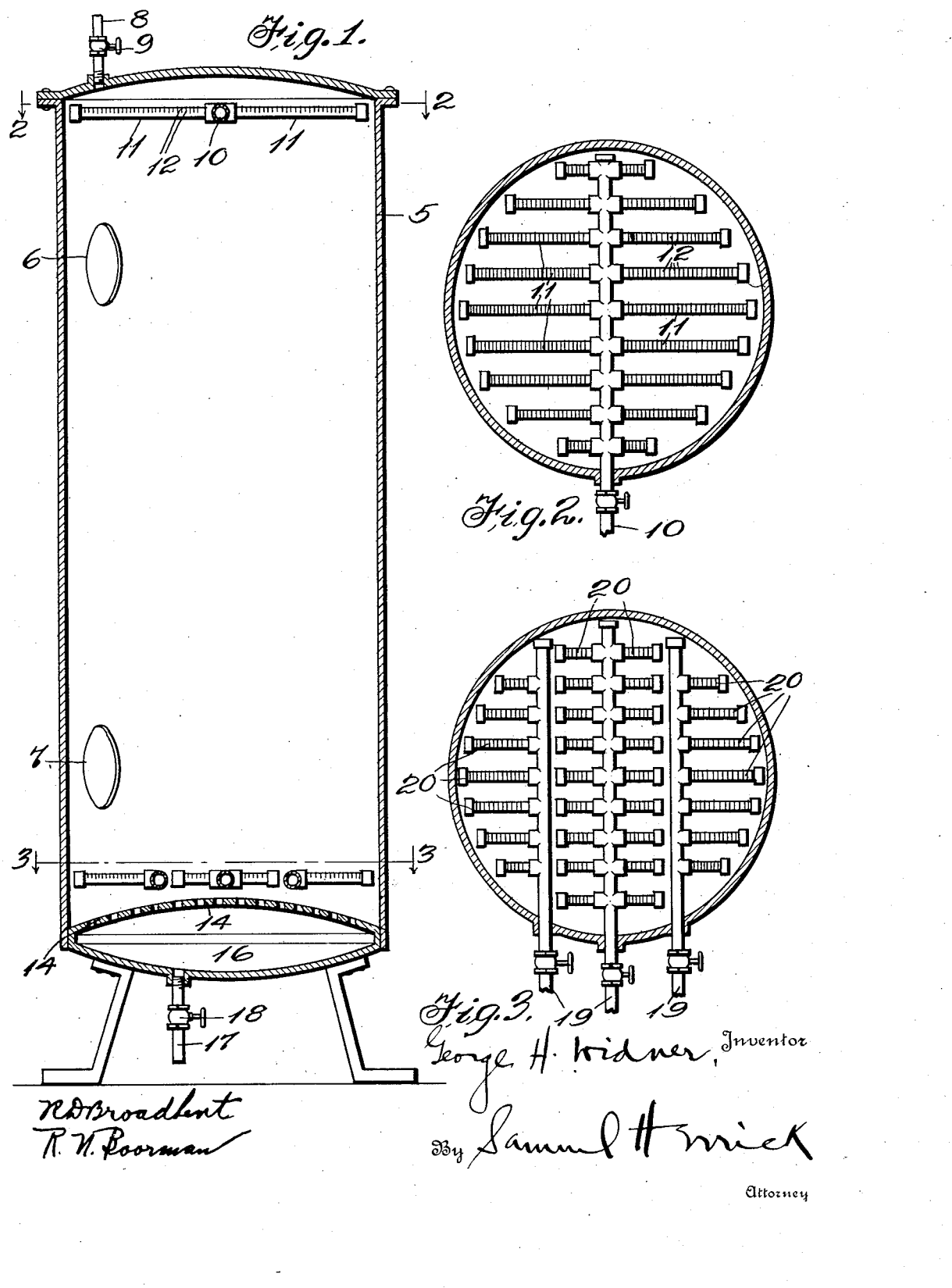

GEORGE H. WIDNER, OF DES MOINES, IOWA, ASSIGNOR TO DES MOINES REFINING COMPANY, OF DES MOINES, IOWA, A CORPORATION OF IOWA.

WATER-SOFTENING FILTER.

1,196,058.   Specification of Letters Patent.   Patented Aug. 29, 1916.

Application filed May 23, 1916. Serial No. 99,294.

*To all whom it may concern:*

Be it known that I, GEORGE H. WIDNER, a citizen of the United States, residing at 109–11 East Walnut street, Des Moines, in the county of Polk and State of Iowa, have invented certain new and useful Improvements in Water-Softening Filters, of which the following is a specification.

This invention relates to water softening filters and its object is to provide an improved article of this nature of what I term the "downward" type and wherein the water is admitted above a mass of "refinite" i. e. a zeolite-like substance, passes downwardly therethrough and thereby softened and the treated water is drawn from the lower portion of the filter.

Further objects and advantages of the invention will be set forth in the detailed description which now follows.

In the accompanying drawing Figure 1 is a vertical sectional view of a filter and water softener constructed in accordance with the invention. Fig. 2 is a horizontal sectional view upon line 2—2 of Fig. 1, and Fig. 3 is a horizontal sectional view upon line 3—3 of Fig. 1.

Like numerals designate corresponding parts in all of the figures of the drawing.

Referring to the drawing, the numeral 5 designates a filter casing having hand-hole openings 6 and 7 and provided in its top with an inlet or pipe 8, having a valve 9 and a man-hole 9ª. A water distributer comprising a main inlet pipe 10 and laterals 11 is disposed in the upper end of the filter casing 5. The pipes constituting this water distributer are sawed transversely to form slots 12 through which the water enters the filter casing 5. The main body of the casing indicated in a general way at R is in practice filled with the mass of refinite, this being the trade name of a zeolite-like substance adapted to take up those impurities in the water the presence of which renders the water "hard."

The mass of refinite R is supported upon a perforated convex plate 14. The space 16 constitute a pure water chamber from which the water that has been filtered or softened is drawn through a pipe 17, said pipe being provided with a valve 18.

A battery of flushing pipes is located in the space "R" immediately above the perforated plate 14 and comprises a plurality of main pipes 19 and laterals 20, the latter being slotted in the manner indicated with respect to the lateral pipes 11. The purpose of the flushing pipes is to discharge water upwardly through the mass of refinite. In practice, water flowing downwardly from the distributer at the top of the filter passes through the refinite and said refinite absorbs or takes up the calcium contained in the water and the softened water passes in to the chamber 16. However, in the course of time, this refinite has taken up all of the calcium that it is capable of absorbing and it then becomes necessary to remove this calcium before the device is of further efficiency in softening water. This is done by passing a salt solution through the refinite. However, it has been found in practice that when the refinite becomes packed and has absorbed a great deal of calcium it is difficult to force the salt solution through this packed mass and I, therefore, provide the battery of flushing pipes shown, through which an upwardly directed flow of water may be passed through the refinite with the result that the packed mass is loosened up to such an extent that the salt solution will readily flow therethrough. If desired the salt solution may be introduced through the distributer or through the pipe 8 as desired.

While the elements shown and described are well adapted to serve the purposes for which they are intended, it is to be understood that this invention is not limited to the precise construction set forth but that it includes within its purview whatever changes fairly come within the spirit of the appended claims.

Having described my invention what I claim is:

1. A water softening filter comprising a receptacle, a perforated plate spanning said receptacle adjacent the bottom thereof, means for conducting softened water from the space beneath the perforated plate, a mass of water softening material upon said perforated plate and a water supply means above said mass of material, said water supply means comprising a plurality of horizontally disposed pipes extending over the major portion of the area of the receptacle and transversely slotted to provide orifices that are disposed away from the mass of water softening material.

2. A water softening filter comprising a receptacle, a perforated plate spanning said receptacle adjacent the bottom thereof, means for conducting softened water from the space beneath the perforated plate, a mass of water softening material upon said perforated plate, a water supply means above said mass of material, said water supply means comprising a plurality of horizontally disposed pipes extending over the major portion of the area of the receptacle and transversely slotted to provide orifices that are disposed away from the mass of water softening material and a plurality of horizontally disposed supply pipes located within the mass of water softening material and immediately above the perforated plate, said latter pipes being transversely slotted across their upper faces.

In testimony whereof I affix my signature in the presence of two witnesses.

GEORGE H. WIDNER.

Witnesses:
SAMUEL HERRICK,
GEO. E. TERRY.